United States Patent [19]

Love

[11] 3,961,679

[45] June 8, 1976

[54] VEHICLE FINAL DRIVE AND WHEEL MOUNTING

[75] Inventor: Mahlon Lloyd Love, Osco, Ill.

[73] Assignee: Deere & Company, Moline, Ill.

[22] Filed: Feb. 27, 1975

[21] Appl. No.: 553,890

[52] U.S. Cl. ............................. 180/75; 180/43 A
[51] Int. Cl.² ........................................ B60K 17/04
[58] Field of Search ................. 180/10, 70 R, 73 R, 180/43 A, 75, 88

[56] References Cited
UNITED STATES PATENTS

| | | | |
|---|---|---|---|
| 2,802,542 | 8/1957 | Gerst | 180/75 |
| 2,949,040 | 8/1960 | Bixby | 180/75 X |
| 3,315,757 | 4/1967 | Schlosser | 180/75 |

*Primary Examiner*—Stanley H. Tollberg
*Assistant Examiner*—John P. Shannon

[57] ABSTRACT

A vehicle final drive and wheel mounting, having particular utility on relatively large machines, such as an agricultural harvesting combine or the like, includes a hollow axle housing with a vertical wheel mounting flange at its outer end. The wheel is journaled on the axle housing by means of a large annular ball bearing with an internal ring gear integral with the inner bearing race, one of the bearing races being attached to the wheel and the other being attached to the axle housing flange. A drive shaft extends through the axle housing and the mounting flange and has a gear at its outer end for connecting the drive shaft to the internal ring gear to drive the wheel.

8 Claims, 2 Drawing Figures

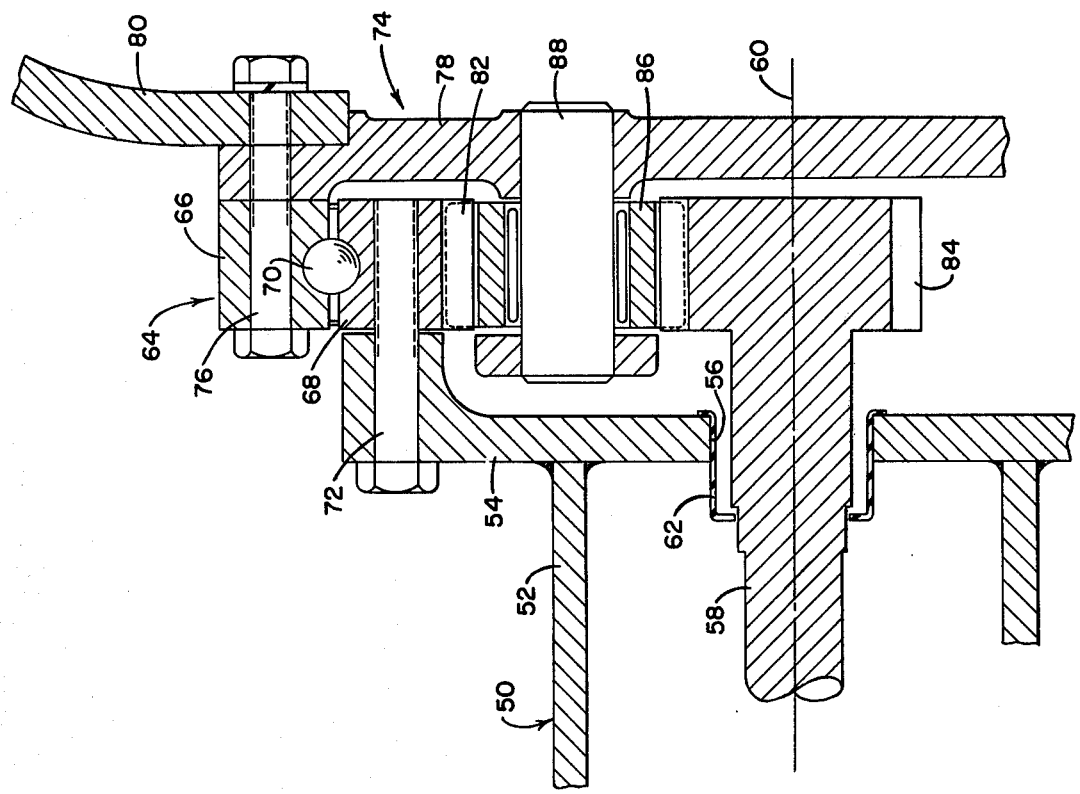

3,961,679

VEHICLE FINAL DRIVE AND WHEEL MOUNTING

BACKGROUND OF THE INVENTION

This invention relates to an improved wheel mounting and final drive for a vehicle, and more particularly to a wheel mounting and final drive having particular utility on a relatively large agricultural or industrial machine, such as a combine or the like.

Such machines have relatively large drive wheels that are driven at a relatively low rotational speed, speed reducing final drives conventionally being provided at the outer end of a rigid axle structure for connecting a wheel drive shaft to the wheel. In such machines, each drive wheel is conventionally mounted on an axle or shaft that extends outwardly from the final drive housing and is journaled therein by a pair of axially spaced wheel bearings mounted in the final drive housing. It is also known to mount a drive wheel on a rigid axle spindle by means of a pair of axially offset bearings between the wheel and the spindle.

SUMMARY OF THE INVENTION

According to the present invention, there is provided an improved wheel mounting and final drive that is simple and durable in construction and requires relatively few number of parts.

An important feature of the invention resides in the fact that the wheel is journaled on a rigid axle housing structure by means of a single large annular bearing having an internal ring gear on the inner race of the bearing, the ring gear forming a part of the final drive. Another feature of the invention resides in the fact that the final drive is enclosed between the vehicle wheel and the outer end of the axle housing structure, the annular bearing forming the peripheral wall of the housing. Still another feature resides in the fact that the design eliminates the conventional cast inner and outer final drive housing halves, the drive and mounting system being formed of fabricated parts and not requiring any castings.

BRIEF DESCRIPTION OF THE DRAWINGS

FIG. 2 is a view similar to FIG. 1, but showing a second embodiment of the invention.

DESCRIPTION OF THE PREFERRED EMBODIMENTS

Figure 1:
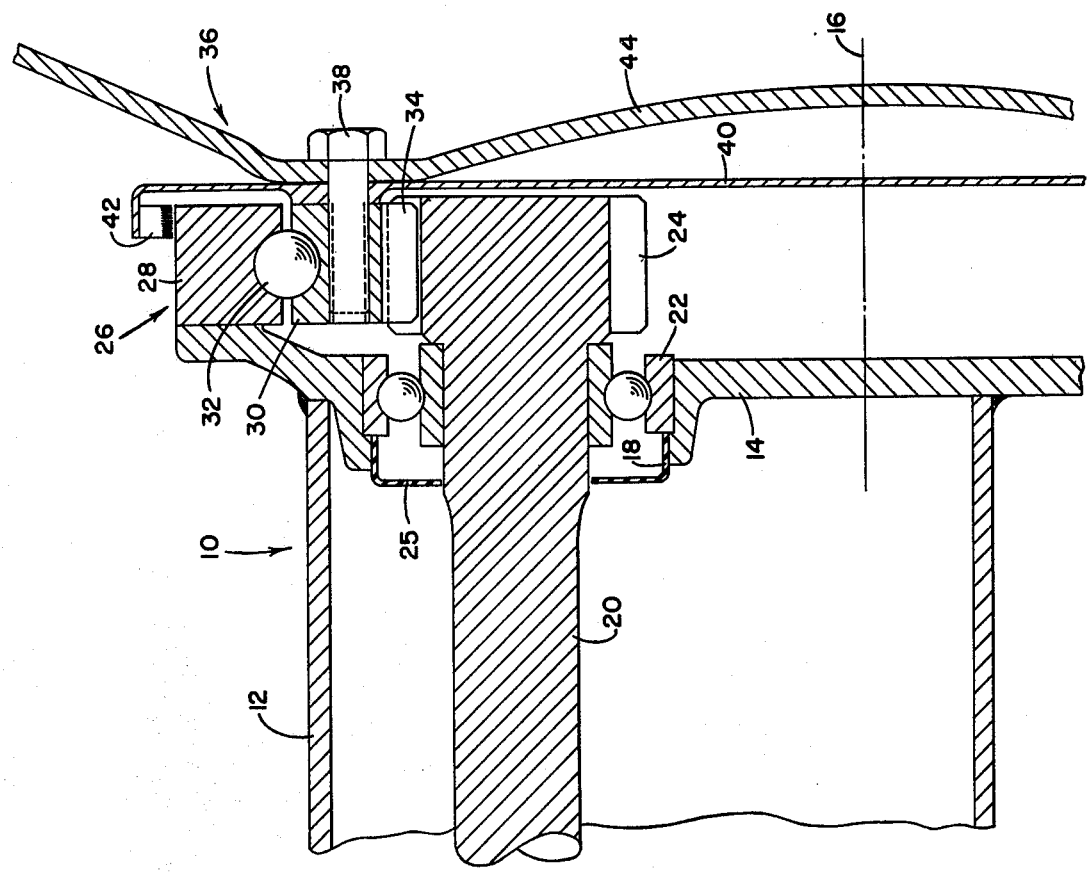
FIG. 1 is a vertical section through the axis of the wheel and the outer end of the vehicle axle housing structure, showing one embodiment of the improved final drive and wheel mounting, the lower half of the wheel and the conventional tire mounting rim being omitted.

The first embodiment of the invention is shown in FIG. 1, wherein the numeral 10 indicates a vehicle axle housing structure in general. The axle housing structure is conventionally rigid with the main frame of such vehicles as agricultural combines, tractors, or forage harvesters or the like and generally include a transverse, relatively large hollow beam or tube 12. A disk-like flange 14 is welded to the outer end of the tube 12 and is generally symmmetrical about the wheel center line, which is indicated by the numeral 16. As is apparent, the flange is eccentrically mounted on the outer end of the tube 12. The flange 14 is provided with a circular opening 18 above the wheel center line 16, and a drive shaft 20 extends through the opening 18 and is journaled therein by a roller bearing 22. The drive shaft is provided with a drive pinion gear 24, that is integral with the drive shaft and disposed at the outer end of the shaft on the exterior side of the bearing 22. An oil seal 25 is mounted in the opening 18 around the shaft 20 on the interior side of the bearing 22.

A large annular, roller bearing 26 is coaxially secured to the flange 14, the wheel center line 16 also being the center line of the bearing, only the upper section of the bearing being shown in the drawing since the lower section is identical. The bearing 26 includes an annular outer bearing race 28, which is secured to the flange 14, and on inner race 30, with a large number of ball-type bearing elements 32 disposed between the bearing races, as is well known. An internal ring gear 34 is formed on the inside of the inner bearing race, the ring gear being integral with the inner bearing race 30. Bearings of the above general type are commercially available, one brand of said bearings coming in sizes from 12 inches to 15 feet in diameter. Such bearings have been used for mounting rotating turntables and for rotating superstructures on large industrial machines, such as backhoes or the like, and are capable of sustaining large thrust, moment, and radial loadings.

A wheel, indicated generally by the numeral 36, is coaxially attached to the inner bearing race 30 by means of a number of circumferentially spaced wheel bolts 38. The wheel includes an inner disk 40 that is provided with a seal 42 around its outer periphery. The seal closes the gap between the rotating inner disk 40 and the stationary outer bearing race 28, the space between the inner disk 40 and the flange 14 forming a closed, sealed chamber in which the drive train for the wheels is disposed, the chamber being filled with a lubricant for the gear train. As is apparent, the bearing forms the outer periphery of the chamber, and the lubricant in the chamber also lubricates the bearing.

The wheel also includes an outer wheel disk 44 that includes the conventional tire mounting rim (not shown) around its outer periphery, the inner and outer wheel disk being bolted to the bearing by the bolts 38.

As is apparent, the drive pinion gear 24 meshes with the internal ring gear 34 to rotate the inner bearing race 30 and the wheel 36 attached thereto.

The second embodiment of the invention is shown in FIG. 2, wherein the numeral 50 indicates the axle housing structure 50, which again includes a relatively large, hollow, square section tube 52 having a disk-like mounting flange 54 welded to the outer end of the tube. The flange 54 is provided with a circular bore 56 through which a drive shaft 58 extends, the drive shaft being disposed within the tube 52 on the wheel center line, which is indicated by the numeral 60. A seal 62 closes the gap between the bore 56 and the shaft 58.

A large, annular ball bearing 64, similar to the bearings 22 in the previous embodiment, includes an outer race 66, in inner race 68 and a plurality of ball-type bearing elements 70, the inner race being attached to the outer side of the flange 54 by a plurality of circumferentially spaced bolts 72 coaxial with the wheel axis 60. A wheel 74 is coaxially attached to the exterior or outer side of the outer bearing race 66 by a plurality of bolt and nut type fasteners 76, the wheel 74 including an inner disk member 78 and an annular outer disk member 80, which overlap and are joined by the fasteners 76. As is apparent, the space between the disk member 78 and the flange 54 forms an enclosed chamber, the bearing 64 being disposed around the periphery of the chamber. An oil seal (not shown) is provided on the exterior side of the bearing in the conventional manner so that the chamber is fluidtight.

An integral internal ring gear 82 is provided around the inside of the inner bearing race 68, and a drive pinion gear 84 is provided on the outer end of the drive shaft 58 within the chamber between the flange 54 and the wheel disk members 78. A planetary pinion gear 86 is journaled on a shaft 88 carried by the inner wheel disk 78 and is disposed between and constantly meshes with the ring gear 82 and the drive pinion 84. Thus, the wheel 74 serves as a planetary carrier, which is rotated in response to rotation of the drive shaft 58, since the ring gear 82 is fixed to the axle housing structure 50. As is apparent, the entire gear train is disposed within the closed chamber, which normally would be filled with lubricant.

I claim:

1. A vehicle final drive and wheel mounting comprising: a nonrotatable axle housing structure connected to the vehicle; a single annular bearing having coaxial annular inner and outer races, and a plurality of bearing elements between the inner and outer races providing relative rotation between the races; and annular internal ring gear having a smaller diameter than and coaxially disposed within the bearing inner race; means coaxially attaching the wheel to one of the bearing races; means connecting the other bearing race to the axle housing structure; a drive shaft journaled for rotation relative to the axle housing structure; and gear means drivingly connecting the drive shaft to the internal ring gear to drive the wheel at a lower speed than the drive shaft.

2. The invention defined in claim 1 wherein the outer race is connected to the axle housing structure and the gear means includes a drive pinion gear on the outer end of the drive shaft.

3. The invention defined in claim 1 wherein the outer race is connected to the wheel and the inner race is connected to the axle housing structure, and the gear means includes a drive pinion gear on the outer end of the drive shaft, and a planetary pinion gear rotatably carried by the wheel and constantly meshing with the drive pinion gear and internal ring gear.

4. The invention defined in claim 3 wherein the axle housing structure is hollow and includes a vertical flange closing the outer end of the housing structure, the annular bearing being disposed between the wheel and the vertical flange to form a closed chamber in which the gear means is disposed, the drive shaft extending through the vertical flange and including seal means between the drive shaft and the flange to seal the chamber.

5. The invention defined in claim 1 wherein the internal ring gear is integral with the inner bearing race.

6. A vehicle final drive and wheel mounting comprising: a hollow non-rotatable axle housing structure connected to the vehicle and having a vertical flange closing the outer end of the housing; an annular bearing having coaxial annular inner and outer races and a plurality of bearing elements between the inner and outer races providing relative rotation between races, the bearing being disposed between the wheel and the vertical flange of the housing to form a closed chamber; an annular internal ring gear disposed interiorly of the bearing inner race; means coaxially attaching the wheel to one of the bearing races; means connecting the other bearing race to the axle housing structure; a drive shaft journaled for rotation relative to the axle's housing structure and extending through the vertical flange; seal means between the drive shaft and the flange to seal the closed chamber; and gear means disposed within the chamber and drivingly connecting the drive shaft to the internal ring gear to drive the wheel at a lower speed than the drive shaft.

7. The invention defined in claim 6 wherein the outer race is connected to the axle housing structure and the gear means includes a drive pinion gear on the outer end of the drive shaft.

8. The invention defined in claim 6 wherein the internal ring gear is integral with the inner bearing race.

* * * * *